(12) United States Patent
Fujita et al.

(10) Patent No.: US 10,325,570 B2
(45) Date of Patent: Jun. 18, 2019

(54) DISPLAY DEVICE HAVING TRANSPARENT BACKLIGHT AND OBJECT LIGHT PASSING THERETHROUGH

(71) Applicant: OMRON Corporation, Kyoto-shi, Kyoto (JP)

(72) Inventors: Junya Fujita, Ichinomiya (JP); Yuji Hirose, Kyotanabe (JP); Jun Kishimoto, Ogaki (JP)

(73) Assignee: OMRON Corporation, Kyoto-shi (JP)

( * ) Notice: Subject to any disclaimer, the term of this patent is extended or adjusted under 35 U.S.C. 154(b) by 31 days.

(21) Appl. No.: 15/626,968

(22) Filed: Jun. 19, 2017

(65) Prior Publication Data

US 2017/0287439 A1    Oct. 5, 2017

Related U.S. Application Data

(63) Continuation of application No. PCT/JP2015/086402, filed on Dec. 25, 2015.

(30) Foreign Application Priority Data

Jan. 15, 2015   (JP) .................................. 2015-006235

(51) Int. Cl.
*G09G 3/36*     (2006.01)
*G09G 5/10*     (2006.01)
(Continued)

(52) U.S. Cl.
CPC .............. *G09G 5/10* (2013.01); *A63F 7/027* (2013.01); *G07F 17/38* (2013.01); *G09G 3/003* (2013.01);
(Continued)

(58) Field of Classification Search
CPC ..... G02F 1/13; A63F 7/02; G09G 3/36; F21V 7/04
See application file for complete search history.

(56) References Cited

U.S. PATENT DOCUMENTS

2008/0068359 A1* 3/2008 Yoshida ............... G09G 3/3406
                                                        345/204
2012/0299901 A1* 11/2012 Chen ................... G02F 1/13338
                                                        345/212
(Continued)

FOREIGN PATENT DOCUMENTS

JP      2005-338426 A    12/2005
JP      2014-061335 A     4/2014
(Continued)

OTHER PUBLICATIONS

International Search Report of PCT/JP2015/086402 dated Mar. 22, 2016.

(Continued)

*Primary Examiner* — Pegeman Karimi
(74) *Attorney, Agent, or Firm* — Metrolexis Law Group, PLLC

(57) ABSTRACT

A display device includes: a first display unit which is a transmissive display unit; a transparent backlight formed of transparent material, provided relative to the first display unit opposite the viewing surface of the first display unit, and configured to emit light toward the first display unit; a light source configured to output object light to the transparent backlight where light from an object provided opposite the light emission plane of the transparent backlight is output toward the transparent backlight and the first display unit; and a controller configured to control the first display unit, the transparent backlight, and the light source so that light emitted from the transparent backlight shows an image on the first display unit, and so that the object light can pass through the transparent backlight and the first display unit and be output.

11 Claims, 21 Drawing Sheets

(51) Int. Cl.
  *A63F 7/02* (2006.01)
  *G07F 17/38* (2006.01)
  *G09G 3/34* (2006.01)
  *G09G 3/00* (2006.01)
  *F21V 8/00* (2006.01)

(52) U.S. Cl.
  CPC ......... *G09G 3/3406* (2013.01); *G02B 6/0036* (2013.01); *G09G 3/3611* (2013.01); *G09G 2300/023* (2013.01); *G09G 2320/0633* (2013.01); *G09G 2370/18* (2013.01)

(56) References Cited

U.S. PATENT DOCUMENTS

| | | | |
|---|---|---|---|
| 2017/0357117 A1 | 12/2017 | Fujita et al. | |
| 2017/0372668 A1* | 12/2017 | Yashiki | G09G 3/20 |
| 2018/0231837 A1* | 8/2018 | Fukuoka | F21S 2/00 |

FOREIGN PATENT DOCUMENTS

| | | |
|---|---|---|
| JP | 2014-117469 A | 6/2014 |
| JP | 2016-131583 A | 7/2016 |

OTHER PUBLICATIONS

Japanese office action dated Jul. 10, 2018 in a counterpart Japanese patent application.

\* cited by examiner

| Pattern Density | Haze | Transparency |
|---|---|---|
| 1.9% | | OK |
| 3.9% | 9.1% | OK |
| 5.8% | | OK |
| 7.7% | 11.7% | OK |
| 15.5% | 17.3% | OK |
| 30.9% | 28.4% | NG |

DISPLAY DEVICE HAVING TRANSPARENT BACKLIGHT AND OBJECT LIGHT PASSING THERETHROUGH

CROSS REFERENCE TO RELATED APPLICATIONS

This application is a continuation application of International Application No. PCT/JP2015/086402, filed on Dec. 25, 2015, which claims priority based on the Article 8 of Patent Cooperation Treaty from prior Japanese Patent Applications No. 2015-006235, filed on Jan. 15, 2015, the entire contents of which are incorporated herein by reference.

FIELD

The disclosure relates to a display device.

BACKGROUND

An image presentation device may be equipped with: a transparent liquid crystal panel that provides transmissive display in a transparent display region; and an LCD with the display screen located behind the transparent liquid crystal panel (refer to for example, Patent Document 1).

Patent Document 1 Japanese Unexamined Patent Application Publication No. 2014-61335

Technical Problem

A transmissive display unit such as a liquid crystal panel may be provided on the front surface of a display device; in this case, the transmissive display unit can only present images using the light exiting from the display device. Therefore, in practical terms presenting sufficiently a bright image via both the transmissive display unit and the display device can be quite challenging. Additionally, there are times when the transmissive display unit cannot express certain colors depending on the color of the image being presented on the display device. For instance, the transmissive display unit is unable to show a blue image superimposed over a region where the display device is presenting a red image.

SUMMARY

As a first embodiment, a display device includes: a first display unit which is a transmissive display unit; a transparent backlight formed of transparent material, provided relative to the first display unit opposite the viewing surface of the first display unit, and configured to emit light toward the first display unit; a light source configured to output object light to the transparent backlight where light from an object provided opposite the light emission plane of the transparent backlight is output toward the transparent backlight and the first display unit; and a controller configured to control the first display unit, the transparent backlight, and the light source so that light emitted from the transparent backlight shows an image on the first display unit, and so that the object light can pass through the transparent backlight and the first display unit and be output.

The controller may switch the light emission state of the transparent backlight while the object light is output.

The controller may cause the first display unit to switch between a state of presenting an image thereon and a state of presenting an image from the object light by switching the transparent backlight between a state where the transparent backlight emits light and a state where the transparent backlight does not emit light while the object light is output.

The transparent backlight may be configured to switch the intensity of light emitted by the transparent backlight between a first light intensity and a second light intensity greater than the first light intensity; and the controller causes the image shown on the first display unit and the image from the object light to be presented simultaneously by setting the light emission intensity of the transparent backlight to said first light intensity while the object light is output.

The controller may vary the intensity of light emitted from the transparent backlight while the object light is output.

The controller may allow the image shown on the first display unit and the image from the object light to be observed substantially at the same time by causing the transparent backlight to switch between a state where the transparent backlight emits light and a state where the transparent backlight does not emit light at a rate greater than a predetermined rate while the object light is output.

The controller may cause the combination of the light emission state of the transparent backlight and the content shown on the first display unit to vary while the object light is output.

The light source may emit light that illuminates the object.

The display device may further include a second display unit configured to output image light based on light from the light source as object light; and the object may be the second display unit.

The controller may cause the image shown on the second display unit to vary while causing an image to be shown on the first display unit with light emitted from the transparent backlight.

The transparent backlight may include a light guide plate formed of transparent material and including a light input surface, a light output surface facing the first display unit, the light guide plate configured to cause light entering from the input surface to propagate therethrough and exit from the output surface; and a light source configured to emit light that enters through the input surface into the light guide plate.

Note that the above summary does not list all the features of the present invention. Sub combinations of these sets of features are also within the scope of the invention.

BRIEF DESCRIPTION OF THE DRAWINGS

FIG. 12 is a table expressing a relationship between pattern density and haze, and how an image appears;

DETAILED DESCRIPTION

The present invention is described below through a description of an embodiment; however, the below-mentioned embodiment is in now way a limitation on the present invention. The all the combinations of features described in the embodiment are not necessarily required for solving the technical problem addressed by the invention.

Figure 1:
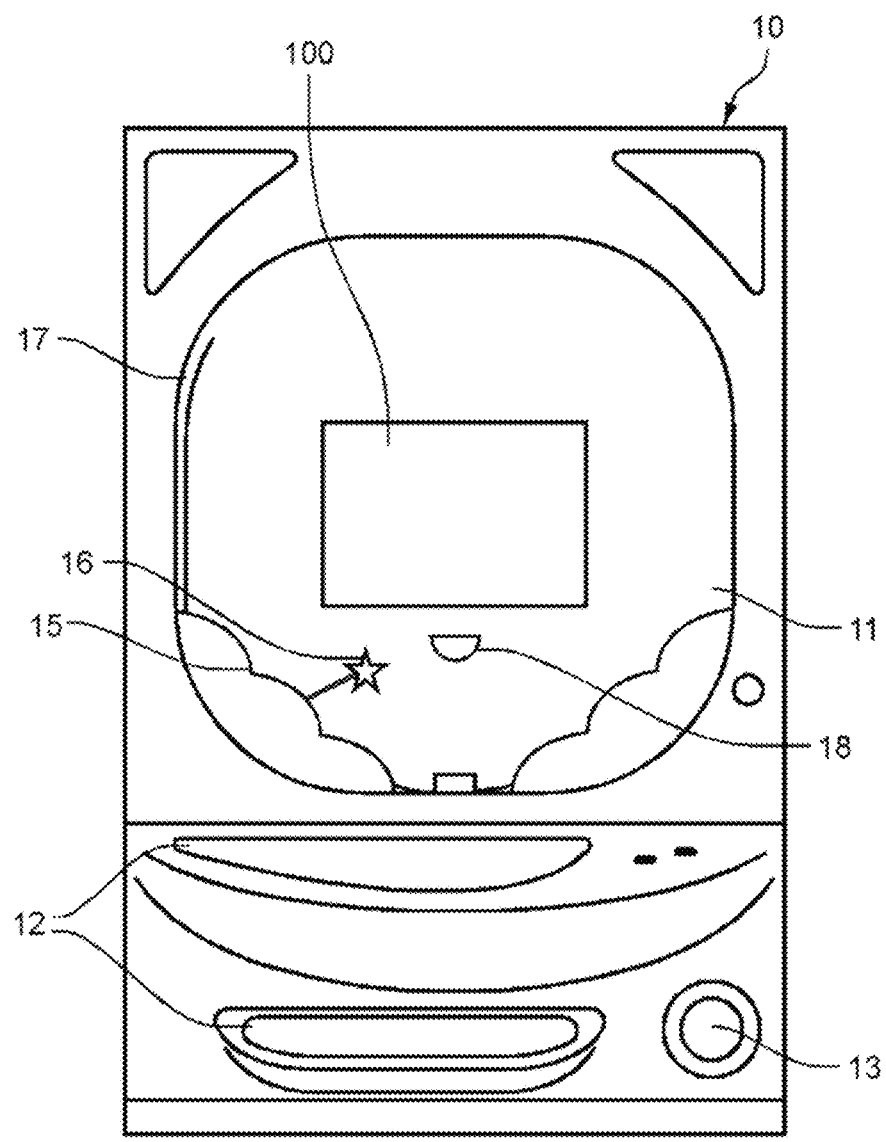
FIG. 1 is a schematic front view of a game machine 10 provided with a display device 100 according to one embodiment.

FIG. 1 is a schematic front view of a game machine 10 provided with a display device 100 according to one embodiment. The game machine 10 is a pinball machine. The game machine 10 includes a playfield 11 that is the main game unit; a ball trough 12; an input unit 13; a display device 100; a stationary gadget 15; moving gadget 16; and at least one prize target 18; and rails 17.

The playfield 11 takes up a majority of the game machine 10, from the top portion to the center. The ball trough 12 and the input unit 13 are provided below the playfield 11. The display device 100 is provided in substantially the center of the playfield 11. The display device 100 is installed on the playfield 11 so that the front surface of the liquid crystal panel faces the player. Note that the front is toward where the user of the game machine 10 is located. In some cases the surface opposite the front is referred to as the rear surface.

The display device 100, stationary gadget 15, moving gadget 16, prize target 18, and rails 17 are provided on the playfield 11. The stationary gadget 15 and the moving gadget 16 are used for presenting the game. The stationary gadget 15 is provided, for example, on the front surface at the lower part of the playfield 11. The moving gadget 16 is provided between the playfield 11 and the stationary gadget 15. Additionally, a is also provided on the playfield 11. Multiple obstacle pins and the like are also provided on the playfield 11 to guide the pinball.

The input unit 13 accepts rotary input from the player. The game machine 10 launches the pinball with a certain force in response to the amount of rotation of the input unit 13. The launched pinball travels on the playfield 11 falling between the multiple obstacle pins. As is later described, the playfield 11 is provided with a controller 30. The controller 30 pays out a predetermined number of pinballs into the ball trough 12 in accordance with the prize associated with the prize target 18 when it is detected that the pinball entered a prize target 18.

The display device 100 presents state of play in accordance with control signals from the presentation controller 300. The display device 100 shows images of various patterns and video graphics and the like in accordance with the state of the game.

Figure 2A:
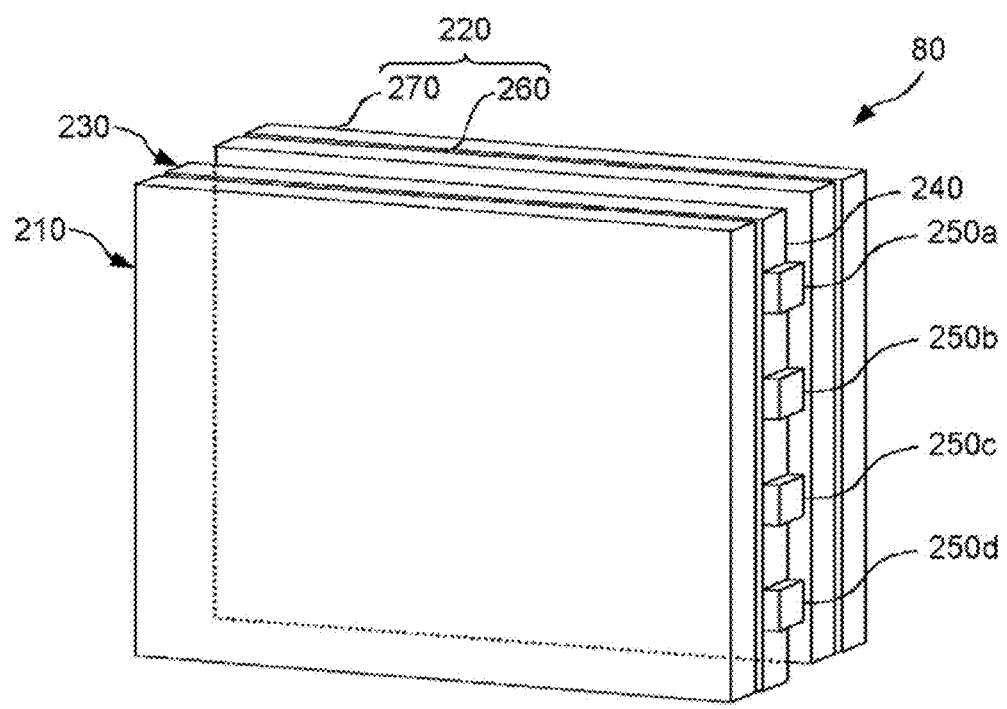
FIGS. 2A and 2B are schematic views of the configuration of a display component 80 provided in the display device 100.
Figure 2B:
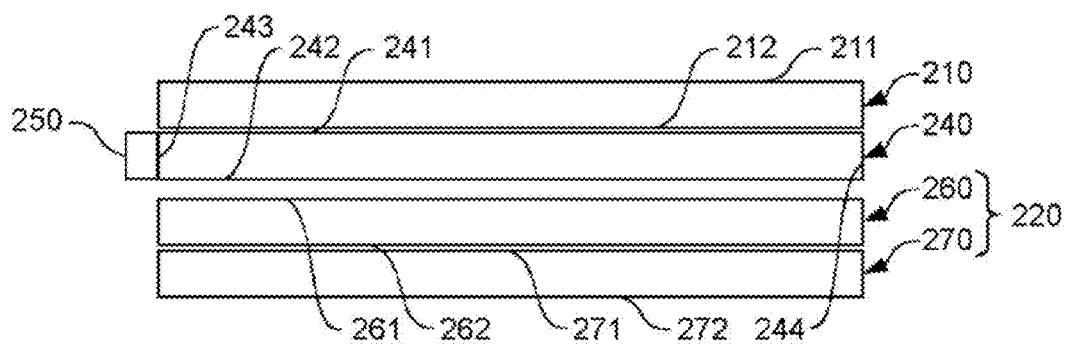

FIGS. 2A and 2B are a schematic view of the configuration of a display component 80 provided in the display device 100. FIG. 2A is a simplified perspective view of a display component 80; and FIG. 2B is a simplified lateral view of the display component 80.

The display device 100 is equipped with a transparent liquid crystal panel 210, a transparent backlight 230, and a liquid crystal display 220. The liquid crystal display 220 includes a liquid crystal panel 260 and a backlight 270.

The transparent liquid crystal panel 210 is one example of a transmissive display unit. The transparent liquid crystal panel 210 includes a front surface 211, which is the surface viewed and a rear surface 212. The rear surface 212 is opposite the front surface 211. The transparent backlight 230 is provided opposite the front surface 211 of the transparent liquid crystal panel 210. The transparent backlight 230 emits light toward the transparent liquid crystal panel 210. The transparent backlight 230 is a transparent surface light source.

The transparent backlight 230 includes a light guide plate 240, a light source 250a, a light source 250b, a light source 250c, and a light source 250d. The light guide plate 240 includes a light input surface 243, a light output surface 241, a diffusion surface 242, and an end surface 244. The diffusion surface 242 is opposite the output surface 241. The input surface 243 and the end surface 244 are one of the side surfaces of the light guide plate 240. The input surface 243 is orthogonal to the diffusion surface 242 and the output surface 241. The end surface 244 is opposite the input surface 243. The light guide plate 240 is produced from a transparent material. For instance, the light guide plate 240 may be molded from a resin, which is transparent to visible light, such as poly methyl methacrylate (PMMA), a polycarbonate, or a cycloolefin polymer. The light guide plate 240 is provided so that the output surface 241 faces the transparent liquid crystal panel 210. The output surface 241 is provided as the light emission surface of the transparent backlight 230. Thus, the transparent backlight 230 is provided so that the output surface 241 of the light guide plate 240 faces the rear surface 212 of the transparent liquid crystal panel 210.

The suffixes for the light source 250a, light source 250b, light source 250c, and light source 250d will be omitted and the same collectively referred to as the light source 250. The light source 250 emits visible light. For example, the light source 250 substantially emits white light. The light source 250 is provided facing the input surface 243 of the light guide plate 240. As one example, the light source 250 may be a light emitting element such as an LED. The light source 250 is arranged so that the direction of maximum light emission therefrom is orthogonal to the input surface 243. To improve the light use efficiency, the light source 250 is preferably a light emitting element that possesses directivity. A collimating lens may also be arranged between the input surface 243 and the light source 250 to improve the directivity of light emitted from the light source 250. Projections may also be formed on the input surface 243 projecting toward the light source 250; the projections function as the collimating lens that improves the directivity of light emitted from the light source 250.

Light from the light source 250 enters the light guide plate 240 from the input surface 243. The light traveling through the light guide plate 240 is totally reflected by the diffusion surface 242 and thereafter exits from the output surface 241; the light then enters the transparent liquid crystal panel 210 from the rear surface 212 thereof.

Thus, when the light source 250 is lit, the light guide plate 240 transmits and scatters the light from the light source 250 therethrough; the light is then output toward the transparent liquid crystal panel 210 and consequently illuminates the transparent liquid crystal panel 210. An image in accordance with the pattern of the amount of light transmitted in the transparent liquid crystal panel 210 is shown on the front surface 211 of the transparent liquid crystal panel 210 via the light from the light guide plate 240.

The liquid crystal panel 260 in the liquid crystal display 220 does not require substantially transparent material; beyond that, the liquid crystal panel 260 has the same configuration as the transparent liquid crystal panel 210. The liquid crystal panel 260 of the liquid crystal display 220 includes a front surface 261 corresponding to the front surface 211, and a rear surface 262 corresponding to the rear surface 212. The rear surface 262 is opposite the front surface 261. Note that the liquid crystal panel 260 is one example of a component provided opposite the transparent backlight 230, and more specifically, opposite to the light emission plane of the transparent backlight 230. The backlight 270 is also one example of a light source; and specifically, the backlight 270 is a light source that outputs light from an object, i.e., image light which is one example of object light.

More specifically, the backlight 270 emits light that illuminates the liquid crystal panel 260 from the rear surface 262 of the liquid crystal panel 260. That is, the backlight 270 allows image light that passes through the liquid crystal panel 260 and then toward the transparent backlight 230 and the transparent liquid crystal panel 210 to be output from the liquid crystal panel 260.

More specifically, the backlight 270 of the liquid crystal display 220 includes a light output surface 271, and a rear surface 272. The rear surface 272 is opposite the output surface 271. The backlight 270 may employ a light guide plate. The backlight 270 may be an edge-type backlight similar to the transparent backlight 230. The transparent backlight 230 may also be configured so that a light source such as a cold cathode ray tube or LED are directly beneath the backlight. The backlight 270 may be provided so that the output surface 271 thereof faces the rear surface 262 of the liquid crystal panel 260.

The liquid crystal panel 260 is illuminated by light emitted from the backlight 270 when the backlight 270 is illuminated. An image in accordance with the pattern of the amount of light transmitted in the liquid crystal panel 260 is shown on the front surface 261 of the liquid crystal panel 260 by way of the light from the backlight 270. Thus, the liquid crystal panel 260 outputs image light on the basis of light from the backlight 270.

Here, when the backlight 270 is lit, the light from the backlight 270 enters the light guide plate 240 from the diffusion surface 242 after passing through the liquid crystal panel 260. The light guide plate 240 is produced from a resin material that is transparent to visible light as above described. Therefore, the light from the backlight 270 that enters the light guide plate 240 from the diffusion surface 242 passes through the light guide plate 240 as is, exits from the output surface 241 toward the transparent liquid crystal panel 210, passes through the transparent liquid crystal panel 210 and exits from the front surface 211. Consequently, a user able to see the front surface 211 of the transparent liquid crystal panel 210 is able to view an image presented on the liquid crystal panel 260 from the front surface 211 of the transparent liquid crystal panel 210.

Figure 3:
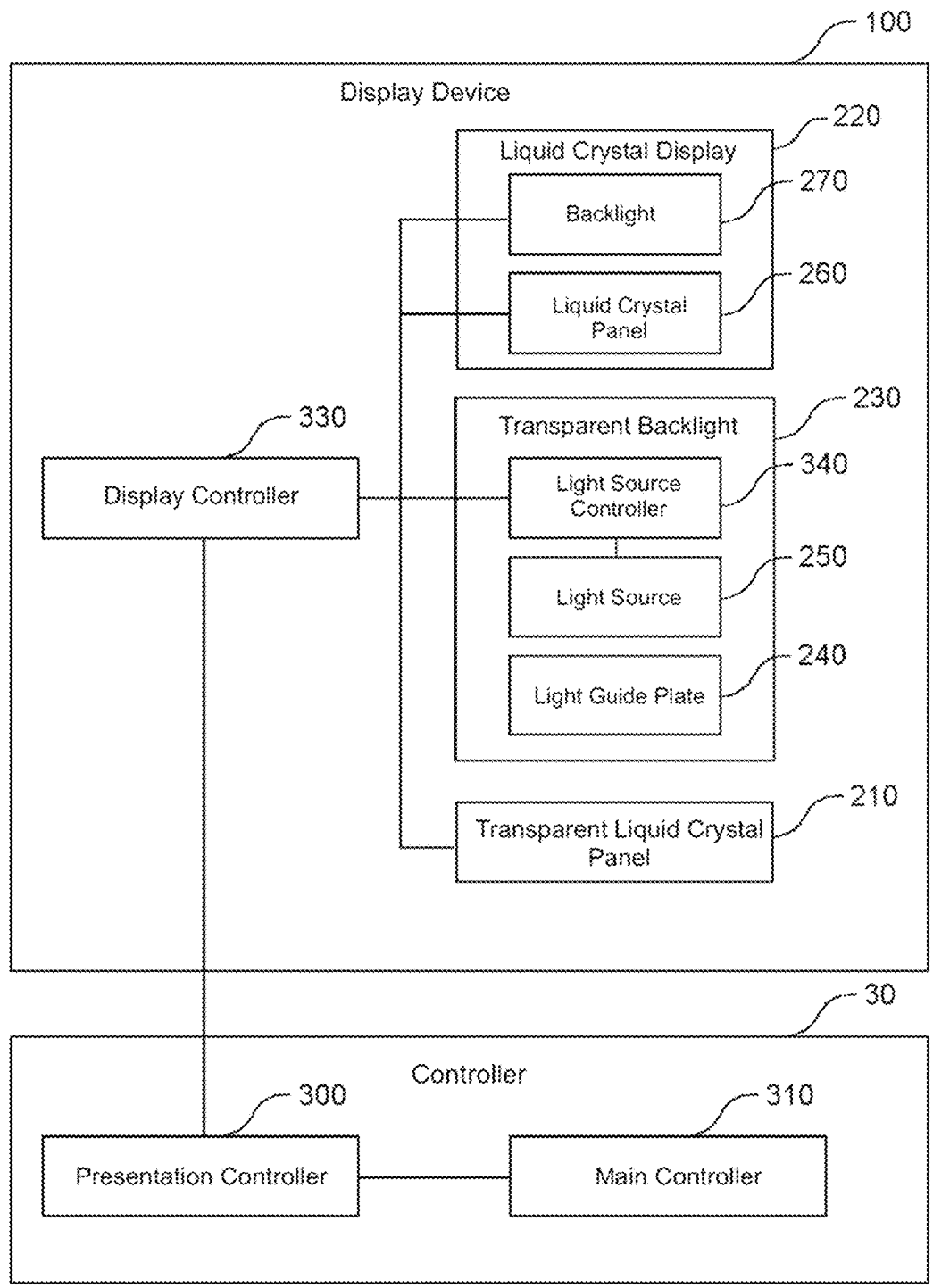
FIG. 3 is a block diagram of a controller 30 and display device 100 provided on a playfield 11.

FIG. 3 is a block diagram of a controller 30 and display device 100 provided on a playfield 11; the controller 30 includes a main controller 310 and a presentation controller 300. The display device 100 is provided with a display controller 330; the transparent liquid crystal panel 210; a light source controller 340; the transparent backlight 230 which includes the light source 250 and the light guide plate 240; and the liquid crystal display 220 which includes the liquid crystal panel 260 and the backlight 270.

The presentation controller 300 controls the display device 100 in accordance with commands from the main controller 310. For instance, the main controller 310 may output information representing the state of the game to the presentation controller 300, directing the presentation controller 300 to provide a visual according to the state of the game. The presentation controller 300 controls presentation on the display device 100 by controlling the display controller 330 on the basis of information from the main controller 310. Note that the state of the game may be, for instance, "Prize Winner" or "Grand Prize!", or the like. The presentation controller 300 controls the display controller 330 in accordance with the state of the game.

The display controller 330 controls the transparent liquid crystal panel 210, the transparent backlight 230, and the light source so that an image is shown on the transparent liquid crystal panel 210 using light emitted from the transparent backlight 230; the display controller 330 also controls the transparent liquid crystal panel 210, the transparent backlight 230, and the light source so that image light from the liquid crystal display 220 may pass through the transparent backlight 230 and the transparent liquid crystal panel 210 and be output. Hereby, the display device 100 may provide an image shown by the transparent liquid crystal panel 210 and an image shown by the liquid crystal display 220 simultaneously.

The display controller 330 also changes how light is emitted from the transparent backlight 230 while causing the liquid crystal display 220 to output image light. For example, the display controller 330 switches the transparent backlight 230 between emitting and not emitting light while causing the liquid crystal display 220 to output image light. Hereby, the display controller 330 is able to switch between having the transparent liquid crystal panel 210 present an image and having the image displayed via image light from the liquid crystal display 220.

The transparent backlight 230 may also switch between a first light intensity and a second light intensity greater than the first light intensity that can be emitted therefrom. As an example, the light source controller 340 may change the duty cycle of the current supplied to the light source 250 in accordance with control by the display controller 330 to change the intensity of the light emitted from the transparent backlight 230. The light source controller 340 may switch among a four-stage duty cycle such as, 0%, 30%, 60% and 100%. The light source controller 340 may continuously and consecutively switch the duty cycle. At this point the display controller 330 causes the liquid crystal display 220 to output image light and selects a first light intensity for the transparent backlight 230, whereby the image shown on the transparent liquid crystal panel 210 and the image created from image light from the liquid crystal display 220 may be presented simultaneously. The second light intensity may be the maximum intensity of the backlight. The second light intensity may be the intensity at a duty cycle of 100%. In contrast, for instance, the second light intensity may be greater than zero but less than the maximum intensity. For example, the second light intensity may correspond to a duty cycle of 30% or 60% or the like.

The display controller 330 also changes the intensity of light emitted from the transparent backlight 230 while causing the liquid crystal display 220 to output image light. Hereby the display controller 330 may control the transparent liquid crystal panel 210 so that the degree of emphasis on the image presented on the transparent liquid crystal panel 210 changes over time in relation to the image formed due to image light from the liquid crystal display 220.

The display controller 330 may switch between causing the transparent backlight 230 to emit light and to not emit light at greater than a predetermined rate while allowing the liquid crystal display 220 to output image light. This allows an image shown on the transparent liquid crystal panel 210 and an image from image light from the liquid crystal display 220 to be shown substantially at the same time. The aforementioned predetermined rate for switching the transparent backlight 230 may be, for instance, a video frame rate or the refresh rate of the transparent liquid crystal panel 210 or the liquid crystal display 220.

The display controller 330 may change a combination of the light emission state of the transparent backlight 230 and what is shown on the transparent liquid crystal panel 210 while causing the liquid crystal display 220 to output image light. For example, the display controller 330 may vary a combination of the light emission intensity of the transparent backlight 230 and the image shown on the transparent liquid crystal panel 210 over time. The display controller 330 may further vary the content of what is shown on the liquid crystal display 220. For example, the display controller 330 may vary the image shown on the liquid crystal panel 260 while causing the transparent liquid crystal panel 210 to display an image using light emitted from the transparent backlight 230. For example, the display controller 330 may also vary a combination of the light emission intensity of the transparent backlight 230, the image shown on the transparent liquid crystal panel 210, and the image shown on the liquid crystal display 220 over time. The display device 100 is thereby capable of providing a variety of highly interesting visuals.

Two transparent substrates are provided facing each other to create transparent electrodes and a liquid crystal is provided filling therebetween to produce the transparent liquid crystal panel 210 in the display device 100. The display controller 330 controls the voltage applied to each portion of the liquid crystal layer by way of the transparent electrodes. The display controller 330 controls the voltage applied to each portion of the liquid crystal layer to vary the orientation of each portion of the liquid crystal layer; with this the transparent liquid crystal panel 210 is able to change the state of different stages of light passing through each portion of the liquid crystal layer. Turning on the transparent backlight 230 at this point allows the transparent liquid crystal panel 210 to show an image in accordance with the pattern that appears due to the difference in the amount of light passing through the transparent liquid crystal panel 210 and exiting from the front surface 211. In contrast, the display controller 330 controls the voltage applied to each portion of the liquid crystal layer to ensure that there is substantially no variation in the state of light passing through each portion of the liquid crystal layer. The display controller 330 also ensures that light substantially passes through the transparent liquid crystal panel 210 and is, for the most part, uniformly output from the front surface 211. That is, the display controller 330 essentially renders the transparent liquid crystal panel 210 transparent. Note that the transparent liquid crystal panel 210 is referred to as being in the ON state when it presents an image, and in the OFF state when it is substantially transparent. The transparent backlight 230 is referred to as being in the ON state when it is illuminated, and is in the OFF state when not illuminated.

The display controller 330 controls how an image is presented on the liquid crystal display 220. That is, the display controller 330 controls the backlight 270 and the liquid crystal panel 260 similar to controlling the transparent liquid crystal panel 210 and the transparent backlight 230 to render the display unit 220 able to show an image. More specifically the display controller 330 turns on the backlight 270 and renders the liquid crystal panel 260 able to shown an image. Additionally, the display controller 330 may prevent the liquid crystal display 220 from showing an image by rendering the liquid crystal panel 260 substantially non-transparent to light. The display controller 330 may turn off the backlight 270 so that an image is not presented on the liquid crystal display 220. The liquid crystal display 220 is referred to as in the ON state when it is showing an image, and is referred to as being in the off state when it is not showing an image.

Figure 4A:
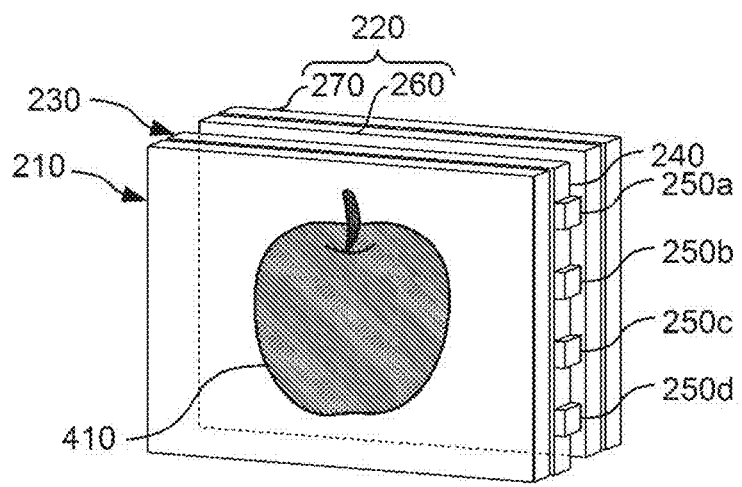
FIGS. 4A, 4B, and 4C illustrate an image presented on the display device 100.
Figure 4B:
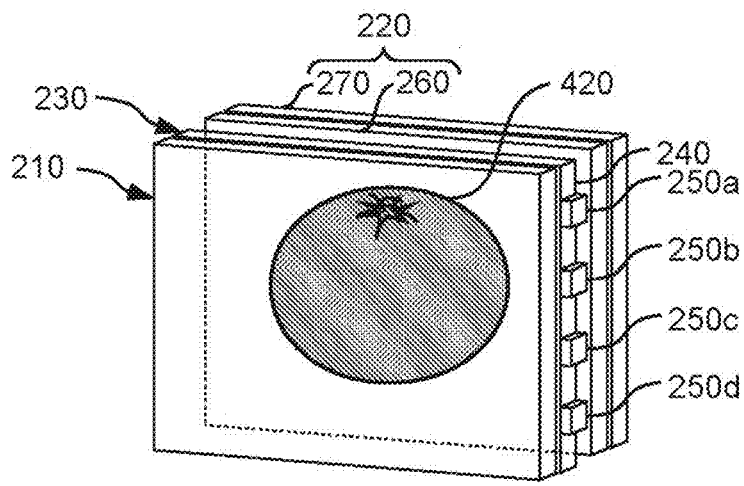
Figure 4C:
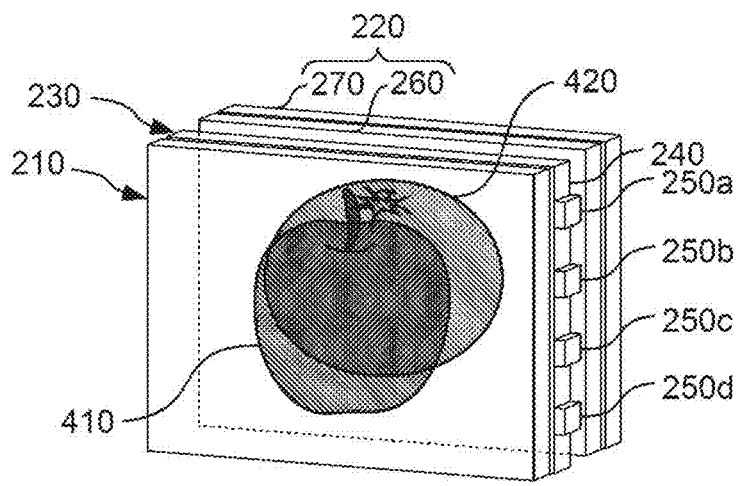

Simple examples of display by the display device 100 are described with reference to FIG. 4A through FIG. 6. FIGS. 4A, 4B, and 4C are schematic views of an image presented on the display device 100. FIG. 4A depicts the transparent liquid crystal panel 210 showing an image while the liquid crystal display 220 does not show an image. More specifically, the transparent liquid crystal panel 210 is in the ON state, the transparent backlight 230 is in the ON state, and the liquid crystal display 220 is in the OFF state. In this state the display device 100 can present the user with the image 410 shown on the transparent liquid crystal panel 210.

FIG. 4B depicts the liquid crystal display 220 showing an image while the transparent liquid crystal panel 210 does not show an image. More specifically, the transparent liquid crystal panel 210 is in the OFF state, the transparent backlight 230 is in the OFF state, and the liquid crystal display 220 is in the ON state. In this state the display device 100 can present the user with the image 420 shown on the liquid crystal display 220.

FIG. 4C depicts the transparent liquid crystal panel 210 and the liquid crystal display 220 both showing an image. More specifically, the transparent liquid crystal panel 210 is in the ON state, the transparent backlight 230 is in the ON state, and the liquid crystal display 220 is in the ON state. Hereby, the display device 100 may present the user with the image 410 shown on the transparent liquid crystal panel 210 and the image 420 shown on the liquid crystal display 220 simultaneously.

The display controller 330 may switch the display device 100 among any of the states in FIG. 4A, FIG. 4B, and FIG. 4C as is desired. For example, the display controller 330 switches the display status of the display device 100 between presenting the state in FIG. 4A and the state in FIG. 4B. The display controller 330 may also switch the display status of the display device 100 between presenting the state in FIG. 4A and the state in FIG. 4C. The display controller 330 may also switch the display status of the display device 100 between presenting the state in FIG. 4A and the state in FIG. 4C. The display controller 330 may also switch the display status of the display device 100 from presenting the states in FIG. 4A, FIG. 4B, and FIG. 4C in that order. Note that the order used to change the display state is not particularly limited to the order described here.

Figure 5A:
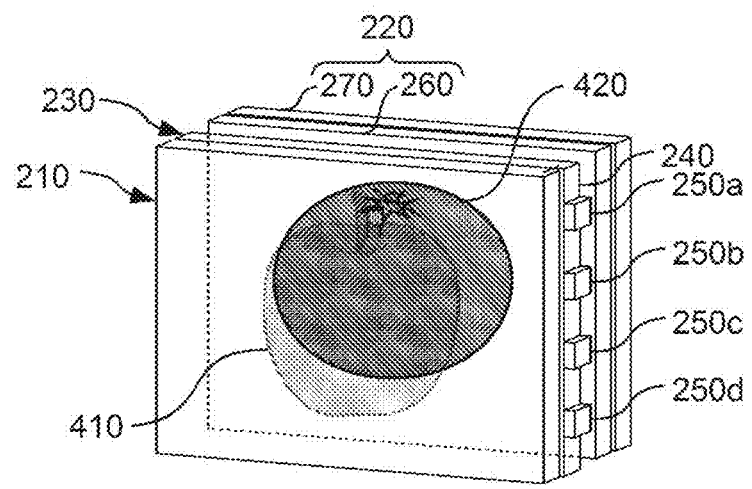
FIGS. 5A and 5B illustrate the transparent liquid crystal panel 210 and a liquid crystal display 220 both showing an image.
Figure 5B:
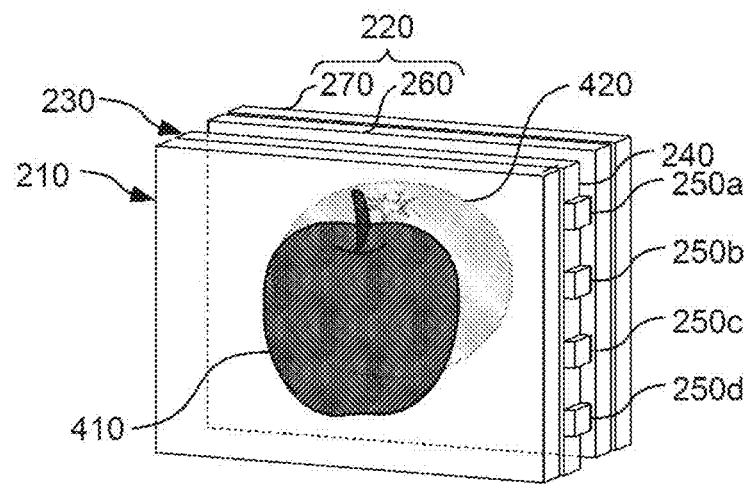

FIGS. 5A and 5B illustrate the transparent liquid crystal panel 210 showing an image together with the liquid crystal display 220: in FIG. 5A the transparent liquid crystal panel 210 shows a low-luminance image; and in FIG. 5B the transparent liquid crystal panel 210 shows a high-luminance image. In FIG. 5A and FIG. 5B, the transparent liquid crystal panel 210 is in the ON state, the transparent backlight 230 is in the ON state, and the liquid crystal display 220 is in the ON state. The light emission intensity of the transparent backlight 230 in FIG. 5B is greater than the light emission intensity of the transparent backlight 230 in FIG. 5A.

In the case of FIG. 5A, the display controller 330 controls the light source controller 340 to set the light emission intensity of the transparent backlight 230 to less than a predetermined intensity, so that the image 420 is a higher luminance than the image 410. Hereby, the display device 100 may emphasize the image 420 shown on the liquid crystal display 220 over the image 410 shown by the transparent liquid crystal panel 210 when presenting the same to the user. Taking into account the luminance of the image displayed on the liquid crystal display 220, the display controller 330 may control the light emission intensity of the transparent backlight 230 so that the luminance of the image 420 is greater than the luminance of the image 410.

In the case of FIG. 5B, the display controller 330 controls the light source controller 340 to set the light emission intensity of the transparent backlight 230 to greater than a predetermined intensity, so that the image 420 is a lower luminance than the image 410. Hereby, the display device 100 may emphasize the image 410 shown on the transparent liquid crystal panel 210 over the image 420 shown on the liquid crystal display 220 when presenting the same to the user. Taking into account the luminance of the image displayed on the liquid crystal display 220, the display controller 330 may control the light emission intensity of the transparent backlight 230 so that the luminance of the image 420 is less than the luminance of the image 410.

Figure 6:
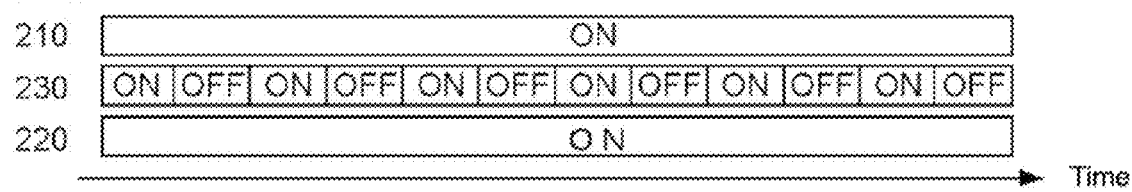
FIG. 6 illustrates another example of control when simultaneously presenting an image 410 and an image 420.

FIG. 6 illustrates another example of control when simultaneously presenting the image 410 and the image 420. The display controller 330 controls the light source controller 340 to switch the transparent backlight 230 very rapidly between being turned on or turned off. The rate for switching the backlight on and off may be greater than a video frame rate. The switching rate may be greater than the refresh rate of the transparent liquid crystal panel 210 or the liquid crystal display 220. To a person, the image 410 and the image 420 may appear to be shown simultaneously by very rapidly switching the transparent backlight 230 on and off.

Figure 7:
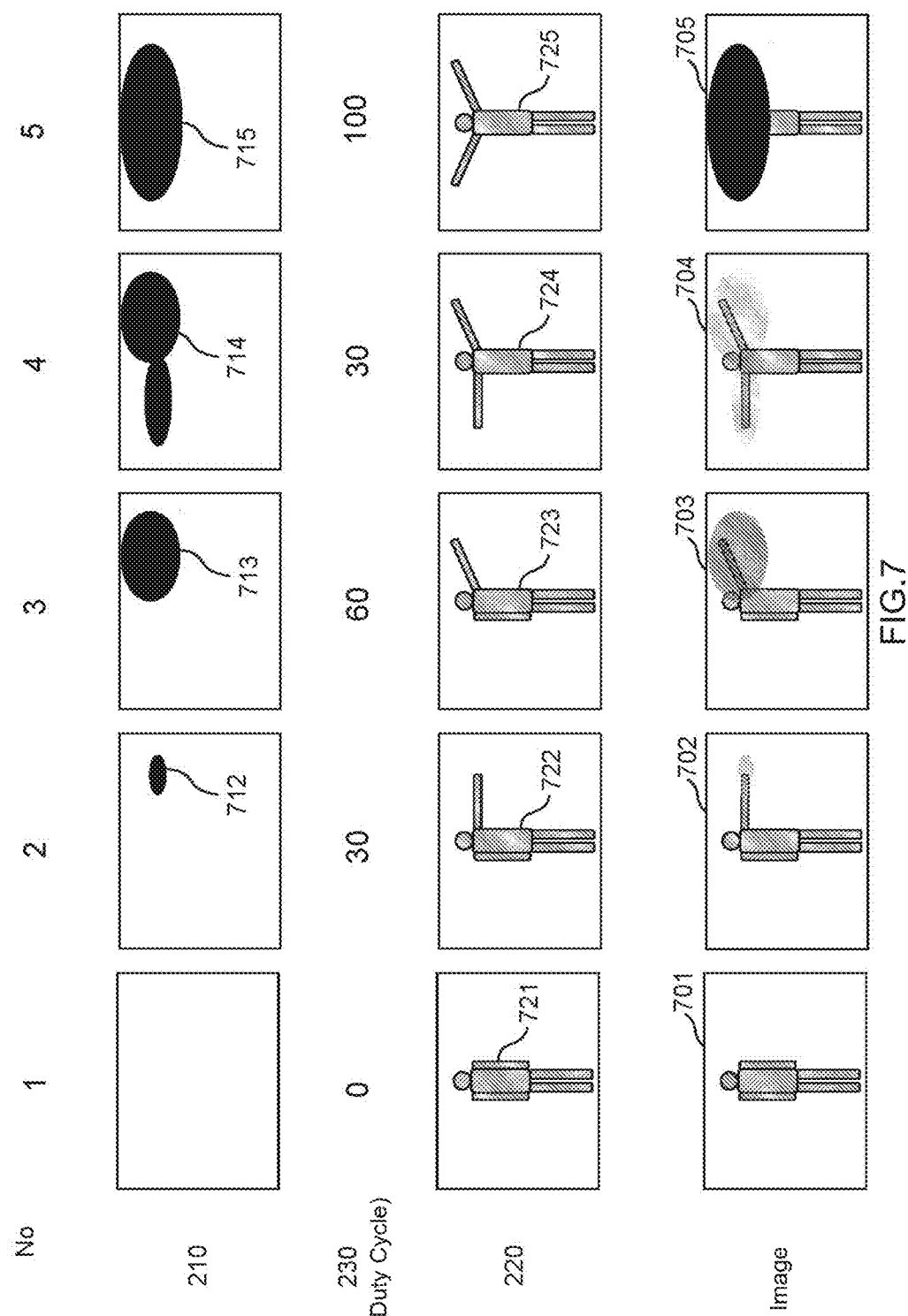
FIG. 7 illustrates an example of the controller 30 and display device 100 controlling presentation.

FIG. 7 illustrates an example of the controller 30 and display device 100 controlling presentation. The main controller 310 provides the presentation controller 300 with a state signal representing the state of the game in the game machine 10. The presentation controller 300 determines what is to be presented depending on the state of the game.

Memory accessible by the presentation controller 300 stores correspondence information that maps the game state to a presentation code. The memory accessible by the presentation controller 300 also stores correspondence information that maps the presentation code to presentation content from the display device 100. As illustrated in FIG. 7, presentation content includes: the transparent liquid crystal panel 210 in the ON or OFF state or the transparent liquid crystal panel 210 showing an image; the duty cycle of the transparent backlight 230; and the liquid crystal display 220 in the ON or OF state or the liquid crystal display 220 showing an image.

The presentation controller 300 specifies a presentation code that is stored in association with a game state represented by the state signal obtained from the main controller 310. The presentation controller 300 controls the display controller 330 on the basis of the presentation content stored in association with the presentation code specified.

When the presentation code is "1", the presentation controller 300 instructs the display controller 330 to place the transparent liquid crystal panel 210 in the OFF state, and place the transparent backlight 230 in the OFF state (i.e., to set the duty cycle to 0%) so that the graphic 721 of a person is shown on the liquid crystal display 220. Hereby the display device 100 presents an image 701 of the graphic 721.

When the presentation code is "2", the presentation controller 300 instructs the display controller 330 to allow the transparent liquid crystal panel 210 to show the graphic 712, and set the duty cycle of the transparent backlight 230 to 30% so that the graphic 722 of a person is shown on the liquid crystal display 220. Hereby the display device 100 presents image 702, which is a low-luminance version of the graphic 712 superimposed on the graphic 722.

When the presentation code is "3", the presentation controller 300 instructs the display controller 330 to allow the transparent liquid crystal panel 210 to show the graphic 713, and set the duty cycle of the transparent backlight 230 to 60% so that the graphic 723 of a person is shown on the liquid crystal display 220. Hereby the display device 100 presents image 703, which is a mid-luminance version of the graphic 713 superimposed on the graphic 723.

When the presentation code is "4", the presentation controller 300 instructs the display controller 330 to allow the transparent liquid crystal panel 210 to show the graphic 714, and set the duty cycle of the transparent backlight 230 to 30% so that the graphic 724 of a person is shown on the liquid crystal display 220. Hereby the display device 100 presents image 704, which is a low-luminance version of the graphic 714 superimposed on the graphic 724.

When the presentation code is "5", the presentation controller 300 instructs the display controller 330 to allow the transparent liquid crystal panel 210 to show the graphic 715, and set the duty cycle of the transparent backlight 230 to 100% so that the graphic 725 of a person is shown on the liquid crystal display 220. Hereby the display device 100 presents image 705, which is a maximum-luminance version of the graphic 715 superimposed on the graphic 725.

The display device 100 may thus optically superimpose and present the pattern shown on the transparent liquid crystal panel 210 onto the pattern shown by the liquid crystal display 220; the display device 100 is thus also capable of changing the degree of emphasis on the superimposing pattern displayed by the transparent liquid crystal panel 210 over time. The display device 100 is thereby able to provide highly interesting visuals.

Figure 8:
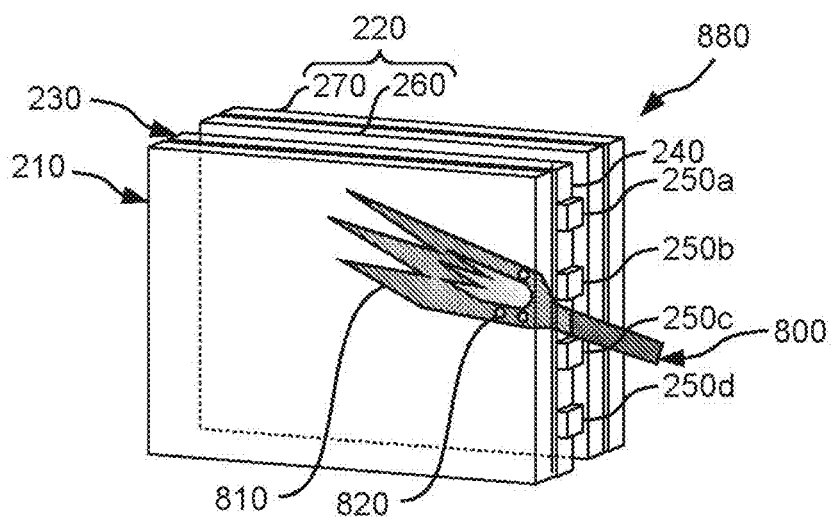
FIG. 8 is a schematic perspective view of a display component 880 and is an example of modifying a display component.

FIG. 8 is a schematic perspective view of a display component 880 and is an example of modifying a display component included in the display device 100. The display component 880 includes an illuminated gadget 800, in addition to the transparent liquid crystal panel 210, the transparent backlight 230, and the liquid crystal display 220 that can be found in the display component 80.

The illuminated gadget 800 is one example of an accessory. The illuminated gadget 800 is a moving gadget. The illuminated gadget 800 moves between appearing inserted between the transparent backlight 230 and the liquid crystal display 220 and appearing withdrawn from between the transparent backlight 230 and the liquid crystal display 220. The illuminated gadget 800 includes a gadget unit 810 and one or more light emitting bodies 820. The light emitting body 820 may be an LED or the like. The display controller 330 controls the illuminated gadget 800 to appear inserted or compared, and controls the emission state of the light emitting bodies 820 on the basis of information received from the presentation controller 300.

Figure 9A:
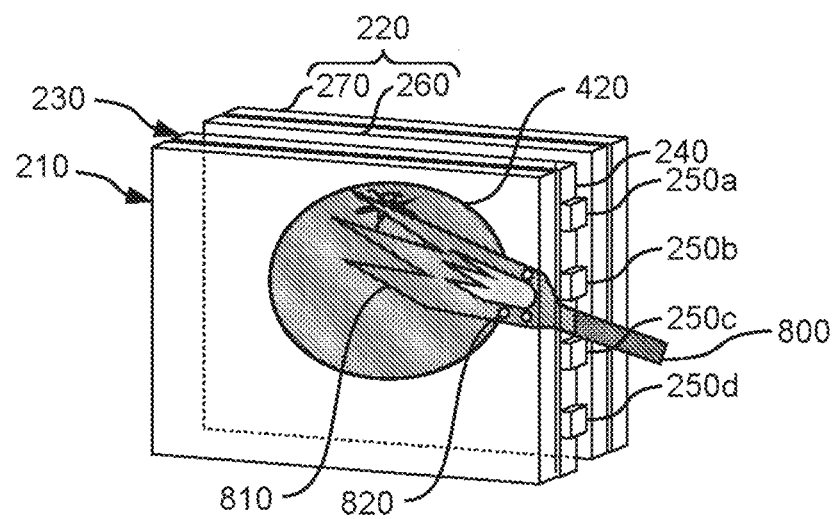
FIGS. 9A and 9B illustrate an image presented by the display component 880.
Figure 9B:
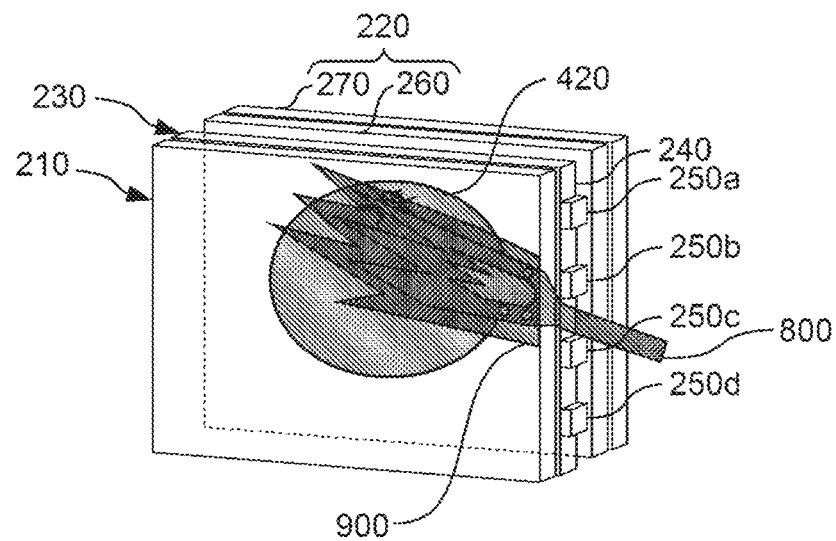

FIGS. 9A and 9B illustrate an image presented by the display component 880; FIG. 9A depicts the liquid crystal display 220 showing an image while the transparent liquid crystal panel 210 does not show an image with the illuminated gadget 800 active. More specifically, the transparent liquid crystal panel 210 is in the OFF state, the transparent backlight 230 is in the OFF state, the liquid crystal display 220 is in the ON state, and the illuminated gadget 800 appears inserted while the light emitting bodies 820 output light. In this state the display device 100 can present the user with the image 420 shown on the liquid crystal display 220, and the illuminated gadget 800 which is emitting light, at the same time.

FIG. 9B depicts the transparent liquid crystal panel 210 showing an image, the liquid crystal display 220 showing an image 900, and the illuminated gadget 800 active. More specifically, the transparent liquid crystal panel 210 is in the ON state, the transparent backlight 230 is in the ON state, the liquid crystal display 220 is in the ON state, and the illuminated gadget 800 appears inserted while the light emitting bodies 820 output light. Hereby, the display device 100 may present the user with the image 900 shown on the transparent liquid crystal panel 210, the image 420 shown on the liquid crystal display 220, and the illuminated gadget 800 which is emitting light, at the same time.

The display controller 330 may switch the display device 100 between the states in FIG. 9A and FIG. 9B as is desired. Note that the example depicted in FIG. 9A, 9B are only combinations of the liquid crystal display 220 in the ON state and the illuminated gadget 800 being active. The display controller 330 may add a combination where the liquid crystal display 220 is in the OFF state, and switch to that combination. The display controller 330 may add a combination where the illuminated gadget 800 is in the OFF state, and switch to that combination.

Figure 10A:
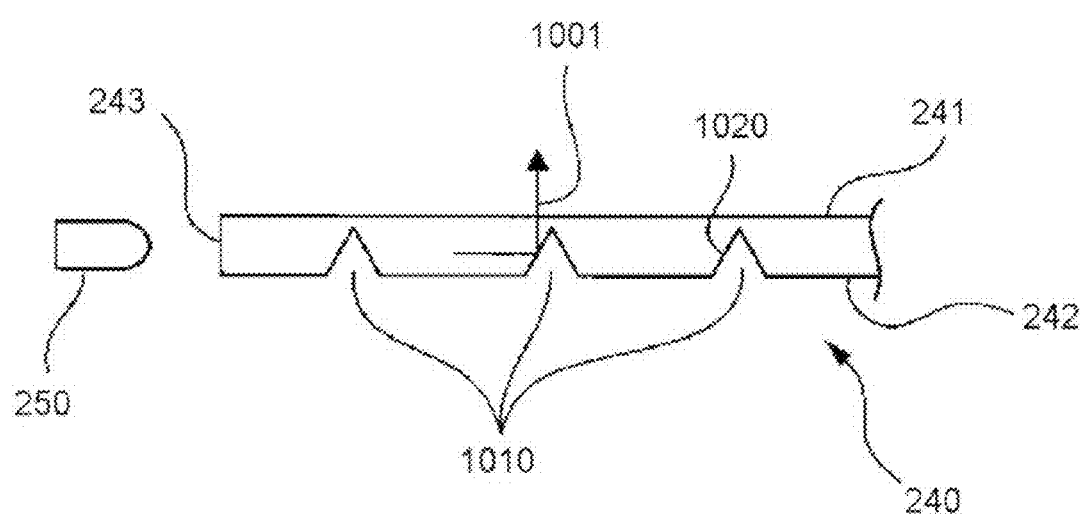
FIGS. 10A and 10B are lateral cross-sectional views illustrating generally a transparent backlight 230.
Figure 10B:
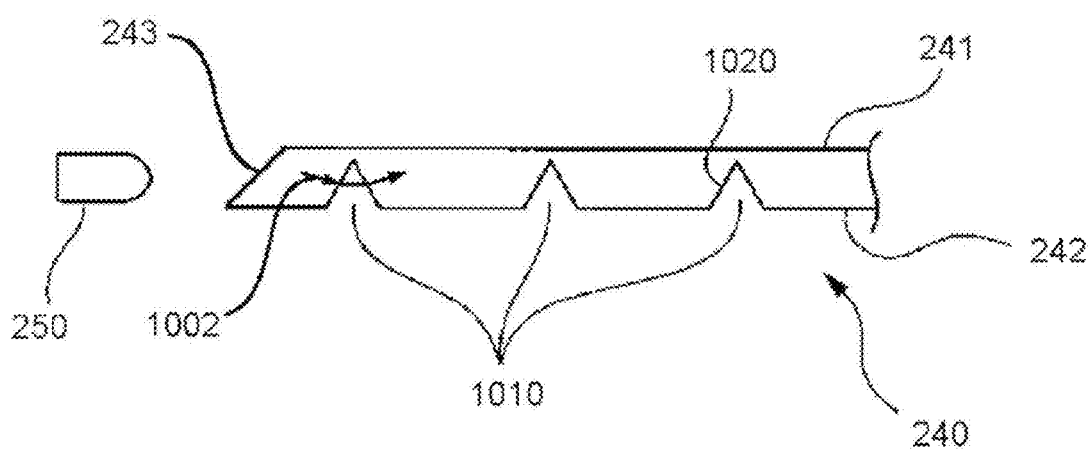

FIGS. 10A and 10B are lateral cross-sectional views illustrating generally a transparent backlight 230. The lateral cross-sectional view is of the light guide plate 240 from the cross section vertical to the output surface 241 along the propagation direction of light entering the input surface 243 orthogonally from the light source 250.

The diffusion surface 242 includes a plurality of prisms 1010. These prisms 1010 reflect the light entering from the input surface 243 causing the light to be substantially uniformly output from the entire output surface 241; the prisms 1010 also ensure the light enters substantially orthogonal to the transparent liquid crystal panel 210.

The plurality of prisms 1010 is formed so that the prisms are lined up at a predetermined pitch along the propagation direction of incident light entering from the input surface 243. The prisms 1010 are roughly triangular grooves formed in the diffusion surface 242; more specifically the triangular grooves extend in a direction substantially orthogonal to the propagation direction of incident light from the input surface 243. The prisms 1010 include a reflection surface 1020 that forms a predetermined angle with the diffusion surface 242. This predetermined angle is set in accordance with the propagation direction of the incident light and the direction light is to exit the light guide plate 240.

In the embodiment, incident light propagates roughly parallel to the diffusion surface 242, and the light guide plate 240 causes light to exit, on the whole, vertically to the output surface 241. Therefore, the reflection surfaces 1020 may be created to form an angle of 37° to 45° with the diffusion surface 242. Preferably the angle α (unit: degrees) of the reflection surfaces 1020, and in particular the angle α between a reflection surface 1020 and the diffusion surface 242 is established to satisfy the following criteria:

$$\alpha < 90 - \tan^{-1}(\sqrt{n^2-1}) \tag{1}$$

Here n is the refractive index of the light guide plate 240. Furthermore, a light emitting element in the light source 250 is preferably selected so that the half angle β (unit: degrees) of light emitted from the light source 250 satisfies the following criteria:

$$\beta < 109.74n - 155.06 \tag{2}$$

For instance, when the light guide plate 240 is produced from a PMMA resin (where the refractive index n=1.49), α is less than 42.17° and β is less than 8.5°. In addition, when the light guide plate 240 is produced from a polycarbonate (where the refractive index n=1.59), α is less than 38.97° and β is less than 19.4°.

Because in this case the light is incident on the reflection surfaces 1020 at greater than the critical angle, the incident light is totally reflected by the reflection surfaces 1020 as illustrated by the arrow 1001. Therefore, the light guide plate 240 is able to inhibit incident light from the light source 250 from exiting via the diffusion surface 242, and is able to control the amount of light not used for illuminating the transparent liquid crystal panel 210.

Preferably, greater than a certain viewing angle is guaranteed so that a user may see an image shown on the transparent liquid crystal panel 210 even when viewing the display device 100 from a diagonal. In order to guarantee a viewing angle of 15° or greater, the angle α between the reflection surface 1020 and the diffusion surface 242 and the half angle β of the light source 250 preferably satisfies the following conditions:

$$\alpha < 1.4924n + 40.274 \tag{3}$$

$$\beta < -0.0327n + 7.5127 \tag{4}$$

For instance, when the light guide plate 240 is produced from a PMMA resin (where the refractive index n=1.49), α is less than 42.5° and β is less than 7.46°. In addition, when the light guide plate 240 is produced from a polycarbonate (where the refractive index n=1.59), α is less than 42.7° and β is less than 7.46°.

Adjacent prisms 1010 may also be formed to have a constant pitch therebetween, so that the intensity of light exiting the output surface 241 does not depend on location.

Another input surface may be created at the end surface 244 of the light guide plate 240 in addition to the input surface 243. That is, the light guide plate 240 may include two opposing input surfaces with a plurality of prisms 1010 arranged therebetween. The light source 250 may also include a light emitting element that emits light that enters the light guide plate 240 from the input surface 243; and a light emitting element that emits light that enters the light guide plate 240 from the end surface 244. In this case, reflection surfaces are formed on both surfaces of each of the prisms 1010, i.e., on the prism surface toward the input surface 243 and on the prism surface toward the end surface 244. These reflection surfaces are formed to satisfy Formula (1) or Formula (3) relative to the diffusion surface 242, so that the incident light is totally reflected toward the output surface 241. The light emitting element arranged facing the end surface 244 may, for example, possess a half angle that satisfies Formula (2) or Formula (4).

In the modification example, the light entering from the input surface 243 and exiting from the output surface 241, And the light entering from the end surface 244 and exiting from the output surface 241 spread out relative to a normal to the output surface 241 in mutually reverse orientations. Therefore, the viewing angle is larger than the example depicted in FIG. 3A.

In another modification example, the end surface 244 which faces the input surface 243 of the light guide plate 240 may be a mirrored surface to reflect the light propagating inside the light guide plate 240 toward the inside of the light guide plate 240. This modification achieves an effect identical to those provided by the above-mentioned modification example.

FIG. 10B is a schematic of another example of modifying the light guide plate 240. In the modification example the input surface 243 is angled at, for instance, 45° relative to the diffusion surface 242. The light entering the light guide plate 240 from the input surface 243 is incident on the diffusion surface 242 and the output surface 241 at roughly 45°, and is totally reflected whereby the light propagates through the light guide plate 240. Here, the light traveling through the light guide plate 240 and reaching a prism 1010 strikes the reflection surface 1020 with an incident angle that is less than the critical angle. However, in this case, as illustrated by the arrow 1002, light exiting from the reflection surface 1020 is refracted towards the diffusion surface 242; therefore, the light reenters the light guide plate 240 from a surface of the prism 1010 further away from the light source 250. Consequently, this prevents a loss in light intensity due to light exiting from the diffusion surface 242 toward the rear surface.

Figure 11A:
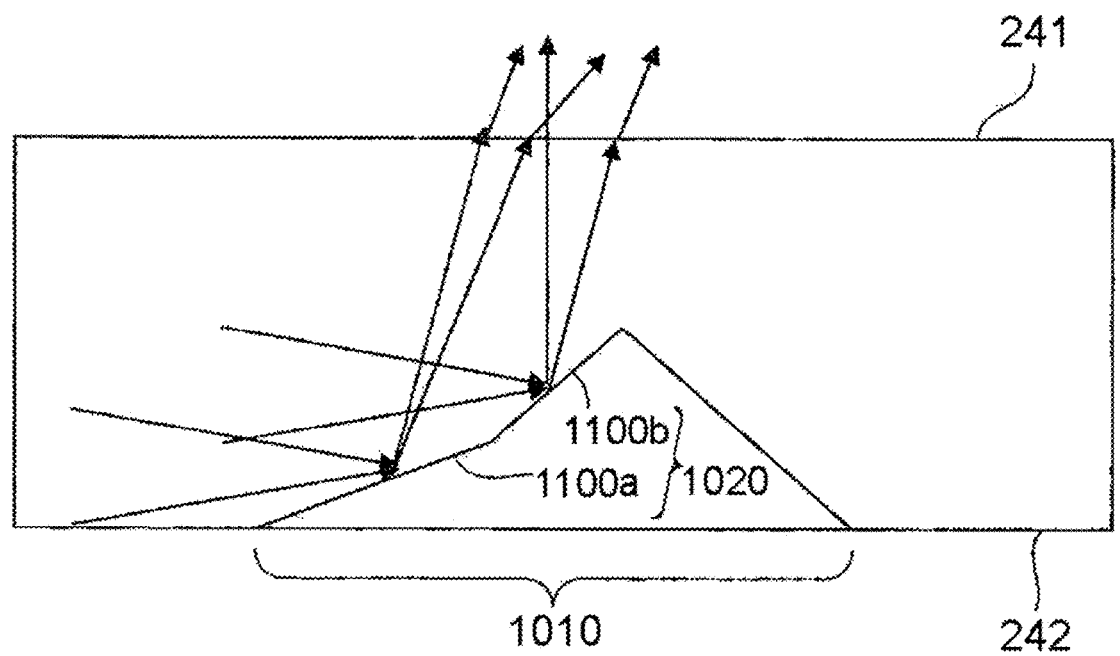
FIGS. 11A and 11B illustrate examples of modifying a reflection surface 1020.
Figure 11B:
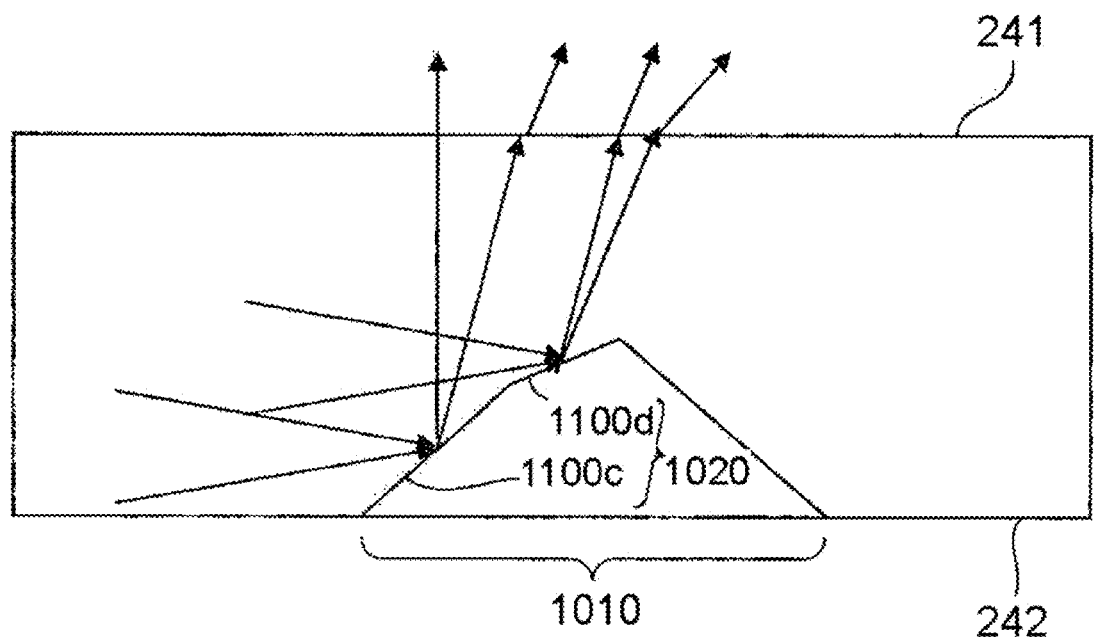

FIGS. 11A and 11B illustrate examples of modifying a reflection surface 1020; FIG. 11A illustrates schematically an example of modifying a reflection surface 1020; In this modification example, the reflection surface 1020 is formed from a plurality of flat surfaces 1100a and flat surfaces 1100b; the angle of inclination of the reflection surface 1020 relative to the diffusion surface 242 increases closer the output surface 241. Alternatively, the reflection surface 1020 may be formed by a cylindrical surface that is recessed relative to the input surface 243 and where the center thereof is flat relative to the output surface 241. This increases the directivity of the light output from the output surface 241.

FIG. 11A illustrates schematically another example of modifying a reflection surface 1020. In this modification example, the reflection surface 1020 is formed from a plurality of flat surfaces 1100c and flat surfaces 1100d; the angle of inclination of the reflection surface 1020 relative to the diffusion surface 242 increases closer the output surface 241 so that the reflection surface 1020 becomes a bump in relation to the input surface 243. Alternatively, the reflection surface 1020 may be formed by a cylindrical surface that protrudes relative to the input surface 243 and where the center thereof is flat relative to the output surface 241. In this case, the viewing angle increases because the light entering the light guide plate 240 is reflected by the reflection surface 1020.

FIG. 12 is a table 1200 created via visual inspection to express the relationship between pattern density and haze, and how an image appears.

Pattern density is the ratio of the area of the region on which the prisms 1010 are formed to the surface area taken up by the diffusion surface 242. The pattern density is preferably less than an upper limit where a user may perceive an image due to light from the rear of the light guide plate 240 via a transparent component or, through the unobstructed air when the transparent liquid crystal panel 210 is in the transparent state. In contrast, the pattern density is preferably greater than a lower limit that allows a user to perceive an image shown on the transparent liquid crystal panel 210 with light from the light source 250 when the transparent liquid crystal panel 210 is in the ON the state.

Haze is the proportion of diffusion light to totally transmitted light. Alternatively, haze is preferably lower than an upper limit where the user can perceive an image on the liquid crystal display 220 behind the transparent liquid crystal panel 210 via a transparent component or the unobstructed air when the transparent liquid crystal panel 210 is in the transparent state.

The left column in the table 1200 represents the pattern density of the prisms 1010, the middle column represents haze, and the right column represents the results of the visual inspection. In the experiment a single tube type white LED (LP-3020H196W) was used as a light source corresponding to the backlight 270. Haze was measured using a haze meter HM-150 L2 (manufactured by Murakami Color Research Laboratory). An object illuminated via the light guide plate 240 and the transparent liquid crystal panel 210 in the transparent state was visually inspected; the result was labeled "OK" when it was perceived that there was a transparent component in front of the object, and labeled "NG" when it was perceived that there was a non-transparent component in front of the object.

The visual inspection results were labeled "NG" when the pattern density exceeded 30% or haze exceeded 28% as illustrated in the table 1200. Thus, preferably, the prisms 1010 are formed so that the pattern density is less than or equal to 30.0%. Alternatively, preferably the prisms 1010 are formed so that haze is less than or equal to 28%.

Figure 13A:
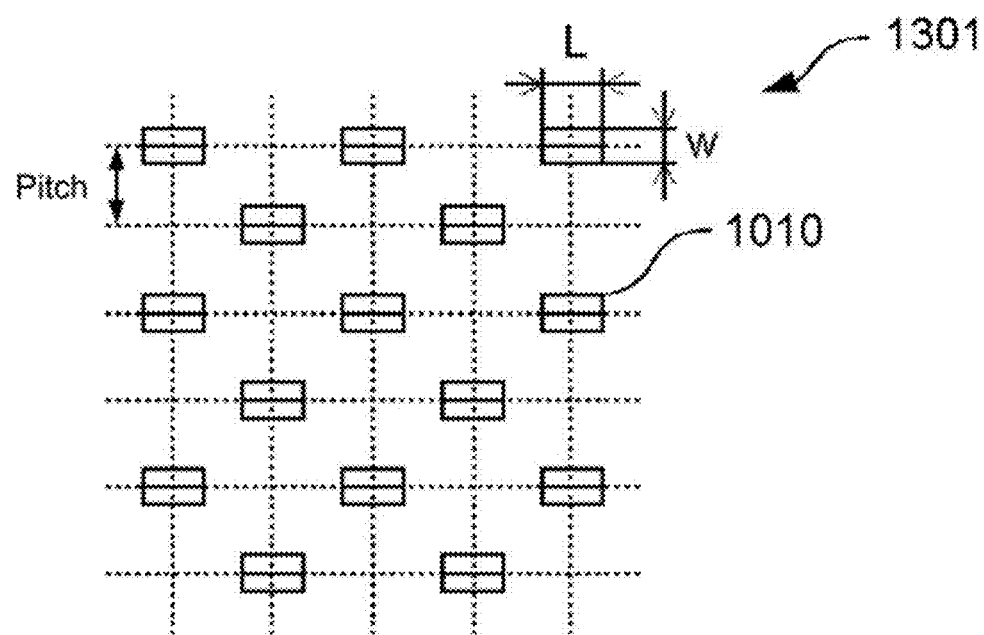
FIGS. 13A, 13B, and 13C illustrate example patterns for distributing prisms.
Figure 13B:
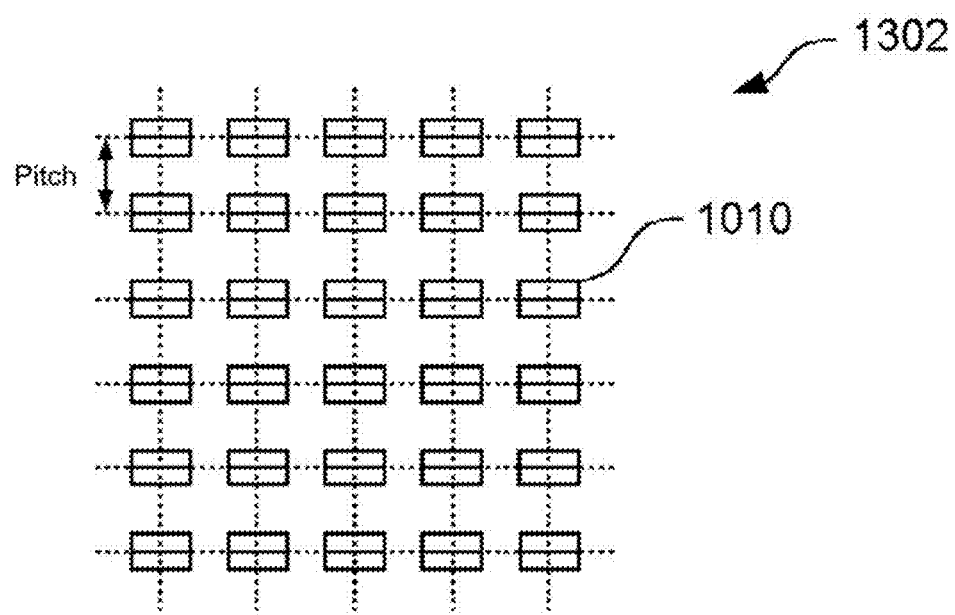
Figure 13C:
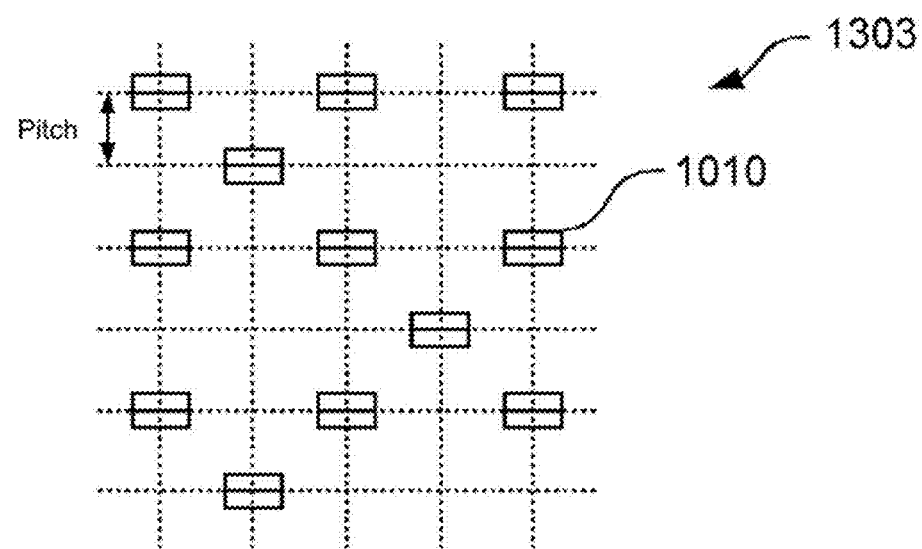

FIGS. 13A, 13B, and 13C illustrate example patterns for distributing prisms; FIG. 13A, FIG. 13B, and FIG. 13C each illustrate an example pattern for distributing prisms when the pattern density is less than or equal to 30.0% and the haze is less than or equal to 28%. In this example, the length W of each of the prisms 1010 along the propagation direction of the incident light is 27.5 μm; and the length L of each of the prisms 1010 in a direction orthogonal to the propagation direction of the incident light is 55 μm. For instance, each of the prisms 1010 are distributed with the pitch of 50 μm and staggered at 50 μm when the pattern density is roughly 30.0% and haze is roughly 28%, as illustrated by the distribution pattern 1301 depicted in FIG. 13A.

The prisms 1010 may also be distributed in a lattice as illustrated by the distribution pattern 1302 depicted in FIG. 13B. When distributed in a lattice, the prisms 1010 may be distributed so that the pitch is 100 μm.

The prisms 1010 may also be distributed so that the number of prisms 1010 is different in each column along a direction orthogonal to the input surface 243 as illustrated by the distribution pattern 1303 depicted in FIG. 13C.

Figure 14:
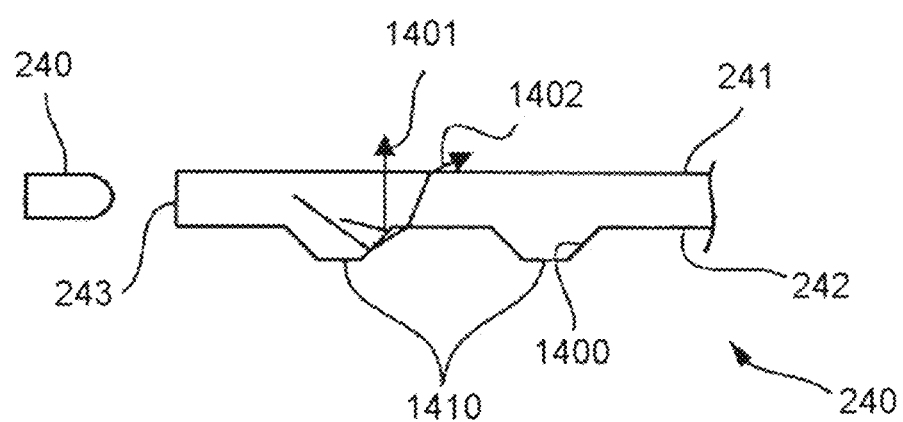
FIG. 14 is the lateral cross-sectional view of another modification to the light guide plate 240.

FIG. 14 is the lateral cross-sectional view of another modification to the light guide plate 240. In this example modification of the light guide plate 240 a trapezoid pattern is formed in the diffusion surface 242; the pattern protrudes from the diffusion surface 242 toward the liquid crystal display 220. The input surface 243 is orthogonal to the diffusion surface 242 and the output surface 241. A plurality of trapezoid prisms 1410 is created on the diffusion surface 242. These prisms 1410 reflect the light entering from the input surface 243 causing the light to be substantially uniformly output from the entire output surface 241; the prisms 1410 also ensure that the light enters substantially orthogonal to the transparent liquid crystal panel 210.

The trapezoid prisms 1410 are lined up at a predetermined pitch along the propagation direction of incident light entering from the input surface 243. The prisms 1410 are formed in the diffusion surface 242 as trapezoid protrusions along a direction substantially orthogonal to the propagation direction of incident light from the input surface 243. Preferably the inclined surface 1400 on the side of the prism 1410 far from the light source 250 is created to totally reflect light propagating within the light guide plate 240 toward the output surface 241 when the light strikes the diffusion surface 242 at a small angle as depicted by the arrow 1401. Moreover, preferably the inclined surface 1400 is also formed so that when the light propagating through the light guide plate 240 strikes the diffusion surface 242 at a given larger angle, even if the light is not totally reflected, the light output to the outside of the light guide plate 240 by the inclined surface 1400 is also refracted by the inclined surface 1400 toward the diffusion surface 242 as illustrated by the arrow 1402. The inclined surface 1400 may, for example, form an angle of 45° with the diffusion surface 242. The inclined surface on the side of the prism 1410 near the light source 250 is not particularly limited, and may be an angle that simplifies molding the light guide plate 240.

The prisms 1410 are preferably formed so the pattern density is less than or equal to 30%, or haze is less than or equal to 28% in this modification example. For instance, the prisms 1410 may be formed so that the width of the prism 1410 along the propagation direction of incident light is 30 μm, and the gap between two adjacent prisms 1410 is 100 μm.

Figure 15:
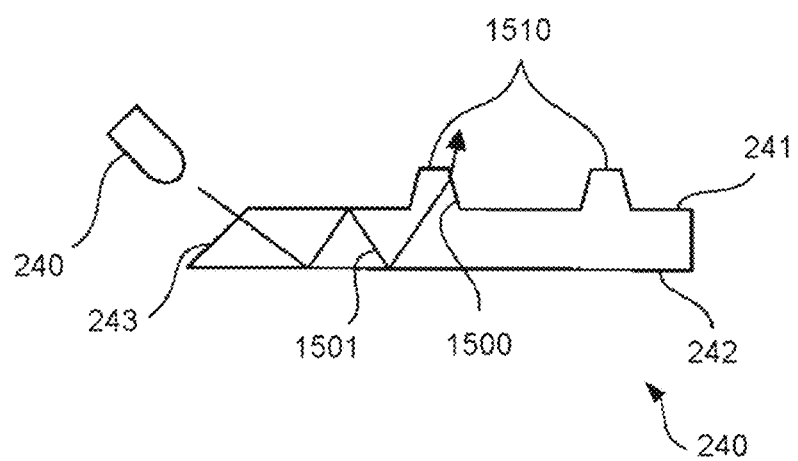
FIG. 15 is the lateral cross-sectional view of another modification to the light guide plate 240.

FIG. 15 is the lateral cross-sectional view of another modification to the light guide plate 240. In this modification example, the diffusion surface 242 on the light guide plate 240 is a flat surface so that light propagating through the light guide plate 240 is totally reflected; the diffusion service 242 includes a plurality of trapezoid prisms formed on the output surface 241. In this modification example, the input surface 243 may be formed at an angle of 45° with the diffusion surface 242; hereby, the majority of the light from the light source 250 propagates through the light guide plate 240 at an angle where the light is totally reflected at the diffusion surface 242. The light source 250 is also arranged so that the direction of maximum light emission therefrom is orthogonal to the input surface 243. In this situation, the light entering the light guide plate 240 from the input surface 243 is incident on the diffusion surface 242 and the output surface 241 at roughly 45°, and is totally reflected whereby the light propagates through the light guide plate 240. A plurality of trapezoid prisms 1510 is formed on the output surface 241 to output incident light totally reflected by the diffusion surface 242 toward the transparent liquid crystal panel 210.

The trapezoid prisms 1510 are lined up at a predetermined pitch along the propagation direction of incident light entering from the input surface 243. The prisms 1510 are formed in the output surface 241 as trapezoid protrusions along a direction substantially orthogonal to the propagation direction of incident light from the input surface 243. Preferably an inclined surface 1500 on the side of the prism 1510 far from the light source 250 is created so that light propagating through the light guide plate 240 is refracted at the inclined surface 1500 to thereby become light oriented in a direction substantially orthogonal to the output surface 241, as depicted by the arrow 1501. The inclined surface 1500 may, for example, form an angle of 70° to 80° with the output surface 241. The inclined surface on the side of the prism 1510 near the light source 250 is not particularly limited, and may be an angle that simplifies molding the light guide plate 240.

The prisms 1510 are preferably formed so the pattern density is less than or equal to 30%, or haze is less than or equal to 28% in this modification example. For instance, the prisms 1510 may be formed so that the width of the prism 1510 along the propagation direction of incident light is 30 μm, and the gap between two adjacent prisms 1510 is 100 μm.

Figure 16:
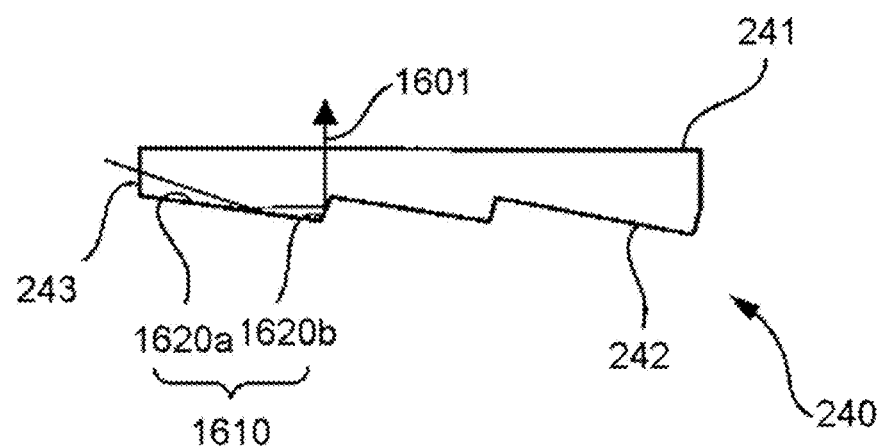
FIG. 16 is the lateral cross-sectional view of another modification to the light guide plate 240.

FIG. 16 is the lateral cross-sectional view of another modification to the light guide plate 240. In this modification example, a saw-like pattern is formed in the diffusion surface 242 of the light guide plate 240. In this modification example the diffusion surface 242 includes a triangular pattern distributed periodically at a predetermined pitch along the propagation direction of incident light entering from the input surface 243. The patterns 1610 are formed from a relatively wide first reflection surface 1620a that increases the thickness of the light guide plate 240 further away from the light source 250 and a second reflection surface 1620b, thinner than the first reflection surface 1620a, that decreases the thickness of the light guide plate 240 further from the light source 250. The first reflection surface 1620a forms and angle of 10° to 20° with the output surface 241 so that light propagating through the light guide plate 240 is totally reflected. Whereas, the second reflection surface 1620b forms the larger angle with the output surface 241 than the first reflection surface 1620a (e.g., 70° to 80°). The second reflection surface 1620b is formed so that light reflected by the first reflection surface 1620a and then entering the second reflection surface 1620b is totally reflected and oriented in a direction roughly perpendicular to the output surface 241.

A louver film may be placed between the light guide plate 240 and the liquid crystal display 220; the louver film blocks light entering diagonally. Note that the louver film may also be placed between the light guide plate 240 and the illuminated gadget 800 when configuring the display component 880 depicted in FIG. 8; the louver film blocks light entering diagonally.

The louver film is one example of a direction-selective light shielding component. The louver film is created by arranging a plurality of non-transparent material at a predetermined pitch along the propagation direction of light from the light source 250 inside a sheet-like material produced from a transparent material such as a transparent resin. The plurality of non-transparent materials is orthogonal to a surface facing the light guide plate 240, and extends along a direction intersecting with the propagation direction of light from the light source 250. The plurality of non-transparent materials preferably extends along a direction roughly parallel to the direction that the prisms 1010 extend. The predetermined pitch may be the width from the end part of the non-transparent material in the louver film facing the light guide plate 240 to the end part facing the liquid crystal display 220 or the illuminated gadget 800; the predetermined pitch may also be less than the aforementioned width. Therefore, even when light from the light source 250 exits from the diffusion surface 242 of the light guide plate 240, the light is blocked by the non-transparent material which prevents that light from illuminating the liquid crystal display 220 or the illuminated gadget 800. In contrast, the non-transparent material in the louver film does not block light entering perpendicular to the surface of the liquid crystal display 220 or the illuminated gadget 800. Therefore, light emitted from the backlight 270 or the illuminated gadget 800 that enters the louver film can pass through the light guide plate 240 and the transparent liquid crystal panel 210 to reach the user. As a result, the user is able to view an image on the liquid crystal display 220 or see light from the illuminated gadget 800 while the transparent liquid crystal panel 210 is in the transparent state and the liquid crystal display 220 shows an image, or while the light emitting element in the illuminated gadget 800 is turned on even when the louver film is provided on the front surface of the liquid crystal display 220 or the illuminated gadget 800.

Light from the light source 250 may leak toward the rear surface of the light guide plate 240. This light may form an angle with a normal line to the diffusion surface 242 of the light guide plate 240. Preferably, the light guide plate 240 is configured so that the intensity of the light leaking in the aforementioned manner at an angle greater than the viewing angle of the louver film is twice or more the intensity of the light leaking at less than the viewing angle of the louver film. Light from the light source 250 may leak toward the rear surface of the light guide plate 240. This light may form an angle with a normal line to the diffusion surface 242 of the light guide plate 240. Alternatively, the light guide plate 240 may be configured so that the intensity of the light leaking in the aforementioned manner at an angle greater than 45° is twice or more the intensity of the leaking light which forms an angle of less than 45°.

The modification example prevents the light exiting from the rear of the light guide plate 240 from illuminating an object behind the light guide plate. The modification thus prevents the light from the transparent backlight 230 that strikes and reflects from an object behind the transparent backlight from being output toward the user, when, for example, the transparent backlight 230 is at the maximum luminance.

A polarizer that allows polarized light with a polarization plane oriented in a predetermined direction to pass therethrough may be placed between the liquid crystal display 220 or the illuminated gadget 800 and the light guide plate 240. The polarizer may be provided in place of or in addition to the louver film. The polarizer is arranged so that preferably the transmission axis of the polarizer is the same direction as the transmission axis of the polarization plate on the rear surface of the transparent liquid crystal panel 210. The polarizer attenuates the light exiting the transparent backlight 230 from the diffusion surface 242 and passing therethrough. Additionally, reflection or dispersion at the liquid crystal display 220 or the illuminated gadget 800 changes the polarization direction of this light, the polarizer further attenuates the light before the same re-enters the light guide plate 240. It is thereby possible to prevent light exiting from the rear of the light guide plate 240 from illuminating an object behind the light guide plate. The modification thus prevents the light from the transparent backlight 230 that strikes and reflects from an object behind the transparent backlight from being output toward the user, when, for example, the transparent backlight 230 is at the maximum luminance.

The game machine 10 is one example of a game machine. In addition to the pinball machine, the game machine may be a slot machine.

The processes described as operations of the presentation controller 300 in the above description may be implemented by a processor controlling the other hardware provided to the game machine 10 or the display device 100 in accordance with a program. That is, a processor may operate in accordance with a program to control pieces of hardware, whereby the processes described in relation to the presentation controller 300 are implemented by operation of each piece of hardware including the processor and memory and the like in cooperation with a program. That is, the aforementioned processes may be implemented on a computer, so to speak. The computer may load a program for controlling execution of the above-described processes, operate according to the loaded program, and thereby execute the aforementioned processes. The computer may load the aforementioned program from a computer readable medium storing the program.

The display device 100 installed in the game machine 10 and the display device with the above described modifications are provided as examples the display device. However, the configuration of the game machine 10 and a display device with the above described modifications is not limited to a game machine 10 and may be adopted in any desired display device. The display device may be combined in a display having a screen. The display device may also be combined with a show window or showcase, or used for signage. For instance, instead of the backlight, the display device may be provided with a light source that illuminates an article, such as a product or the like in a show window or showcase. In this case, the "object" is the article inside the show window, and object light is the light emitted from the light source and reflected from the article. The display device according to the embodiments thus effectively exhibits the article.

The present invention is hereby described by way of the embodiments; however, the technical scope of the present invention is not limited to the above-described embodiments. It is obvious to a person skilled in the art that the above described embodiments can be modified or improved in various ways. The scope of the claims makes it clear whether such kinds of modifications or improvements to the embodiments are within the technical scope of the present invention.

It should be noted that unless explicitly stated with terms such as "before", "prior to", and the like, and unless the output of a prior process is used in a subsequent process, the sequence of execution of operations procedures, steps, and stages within the devices, systems, programs, and methods expressed in the scope of the claims, the specification, and the drawings, may be executed any order as desired. The terms "first", "next", and the like are used for convenience when describing operational flows within the scope of the claims, the specification, and in the drawings, and does not mean that execution in this order is required.

The invention claimed is:

1. A display device comprising:
   a first display unit comprising a transmissive display unit;
   a transparent backlight provided on a side of the first display unit opposite a viewing surface of the first display unit, and configured to emit light toward the first display unit;
   a light source provided on a side of the transparent backlight that is opposite a light emission plane of the transparent backlight, and configured to output object light of an object to the transparent backlight and toward the first display unit, the light source comprising a second backlight; and
   a controller configured with a program to perform operations comprising controlling the first display unit, controlling the transparent backlight, and controlling the light source so that light emitted from the transparent backlight shows an image on the first display unit, and so that the object light: passes through the transparent backlight; and passes through the first display unit and is output.

2. The display device according to claim 1, wherein the controller is configured with the program to perform operations further comprising switching the light emission state of the transparent backlight in response to the object light passing through the first display unit.

3. The display device according to claim 1, wherein the controller is configured with the program such that controlling the first display unit comprises causing the first display unit to switch between a state of presenting an image on the first display unit and a state of presenting an image from the object light by switching the transparent backlight between a state of emitting light and a state of not emitting light while the object light is output.

4. The display device according to claim 1, wherein the controller is configured with the program such that controlling the transparent backlight comprises:
   switching an intensity of light emitted by the transparent backlight between a first light intensity and a second light intensity greater than the first light intensity; and
   causing the image shown on the first display unit and the image from the object light to be presented simultaneously by setting the intensity of the transparent backlight to the first light intensity while the object light is output.

5. The display device according to claim 1, wherein the controller is configured with the program such that controlling the transparent backlight comprises varying an intensity of light emitted from the transparent backlight while the object light is output.

6. The display device according to claim 1, wherein the controller is configured with the program such that controlling the first display unit and controlling the transparent backlight comprise causing the image shown on the first display unit and the image from the object light to be observed substantially at the same time by causing the transparent backlight to switch between a of emitting light and a state of not emitting light at a rate greater than a predetermined rate while the object light is output.

7. The display device according to claim 1, wherein the controller is configured with the program such that controlling the first display unit and controlling the transparent backlight comprise causing a combination of a light emission state of the transparent backlight and the content shown on the first display unit to vary while the object light is output.

8. The display device according to claim 1, wherein the light source emits light that illuminates the object.

9. The display device according to claim 1, wherein the object comprises a second display unit configured to output image light based on light from the light source as the object light.

10. The display device according to claim 9, wherein the controller is configured with the program such that controlling the first display unit, controlling the transparent backlight, and controlling the light source comprises causing an image shown on the second display unit to vary while causing an image to be shown on the first display unit with light emitted from the transparent backlight.

11. The display device according to claim 1, wherein the transparent backlight comprises:
   a light guide plate formed of transparent material and comprising a light input surface and a light output surface facing the first display unit, the light guide plate configured to cause light entering from the input surface to propagate through the light guide plate and to exit from the output surface; and
   a transparent backlight light source configured to emit light that enters through the input surface into the light guide plate.

* * * * *